(12) United States Patent
Wehrmann et al.

(10) Patent No.: US 8,158,745 B2
(45) Date of Patent: Apr. 17, 2012

(54) POLYCARBONATES HAVING REARRANGEMENT STRUCTURES, CYCLIC AND LINEAR OLIGOMERS AND ALSO FLOW BEHAVIOR

(75) Inventors: Rolf Wehrmann, Krefeld (DE); Helmut-Werner Heuer, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/988,456

(22) PCT Filed: Apr. 9, 2009

(86) PCT No.: PCT/EP2009/002662
§ 371 (c)(1),
(2), (4) Date: Nov. 2, 2010

(87) PCT Pub. No.: WO2009/127366
PCT Pub. Date: Oct. 22, 2009

(65) Prior Publication Data
US 2011/0040066 A1 Feb. 17, 2011

(30) Foreign Application Priority Data
Apr. 18, 2008 (DE) .......................... 10 2008 019 503

(51) Int. Cl.
*C08G 64/00* (2006.01)
*C08G 63/02* (2006.01)

(52) U.S. Cl. ......... 528/196; 528/167; 528/298; 528/461

(58) Field of Classification Search .................. 528/167, 528/196, 198, 461
See application file for complete search history.

(56) References Cited

U.S. PATENT DOCUMENTS

| | | |
|---|---|---|
| 3,022,272 A | 2/1962 | Schnell et al. |
| 5,235,026 A | 8/1993 | Wulff et al. |
| 5,340,905 A | 8/1994 | Kuhling et al. |
| 5,399,659 A | 3/1995 | Kuhling et al. |
| 5,779,986 A | 7/1998 | van Endert et al. |
| 6,228,973 B1 | 5/2001 | McCloskey et al. |
| 6,248,859 B1 | 6/2001 | Caruso et al. |
| 6,265,525 B1 | 7/2001 | Kinoshita et al. |
| 6,569,986 B1 | 5/2003 | Lemmon et al. |
| 6,630,563 B2 | 10/2003 | Hucks et al. |
| 6,639,043 B1 | 10/2003 | Lemmon et al. |
| 6,706,848 B1 | 3/2004 | Prein et al. |
| 7,250,483 B2 | 7/2007 | Heuer et al. |
| 7,279,544 B2 | 10/2007 | Hucks et al. |
| 7,799,889 B2 | 9/2010 | Meyer et al. |
| 2005/0288407 A1 | 12/2005 | Heuer et al. |

FOREIGN PATENT DOCUMENTS

| | | |
|---|---|---|
| DE | 1031512 B | 6/1958 |
| DE | 1137167 B | 9/1962 |
| DE | 2701173 A1 | 7/1978 |
| DE | 4447422 A1 | 7/1996 |
| EP | 0089801 A1 | 9/1983 |
| EP | 0269324 A2 | 6/1988 |
| EP | 0517044 A2 | 12/1992 |
| EP | 0634445 A1 | 1/1995 |
| EP | 0953605 A2 | 11/1999 |
| EP | 1253163 A1 | 10/2002 |
| EP | 1240232 B1 | 2/2005 |
| EP | 1577333 A2 | 9/2005 |
| EP | 1609818 A2 | 12/2005 |
| EP | 1612231 A1 | 1/2006 |
| GB | 905072 A | 9/1962 |
| GB | 1592724 A | 7/1981 |
| WO | WO-99/28370 A1 | 6/1999 |
| WO | WO-00/37531 A1 | 6/2000 |
| WO | WO-01/02462 A1 | 1/2001 |
| WO | WO-01/95521 A2 | 12/2001 |
| WO | WO-03/010218 A1 | 2/2003 |
| WO | WO-03095521 A1 | 11/2003 |
| WO | WO-2005054335 A1 | 6/2005 |
| WO | WO-2006/072344 A1 | 7/2006 |

OTHER PUBLICATIONS

Brunelle, D.J., *Polycarbonates* (Jan. 13, 2006), URL: http://mrw.interscience.wiley.com/emrw/9780471440260/epst/article/pst255/current/abstract, Encyclopedia of Polymer Science and Technology, GE Global Research, John Wiley & Sons, Inc.

*Primary Examiner* — Terressa Boykin
(74) *Attorney, Agent, or Firm* — Connolly Bove Lodge & Hutz LLP

(57) ABSTRACT

The present invention relates to compositions having improved rheological properties which are based on polycarbonate having rearrangement structures and cyclic and linear oligomers and also moldings and extrudates composed of these polycarbonate compositions.

10 Claims, No Drawings

POLYCARBONATES HAVING REARRANGEMENT STRUCTURES, CYCLIC AND LINEAR OLIGOMERS AND ALSO FLOW BEHAVIOR

CROSS-REFERENCE TO RELATED APPLICATIONS

This application is a national stage application (under 35 U.S.C. §371) of PCT/EP2009/002662, filed Apr. 9, 2009, which claims benefit of German application 102008019503.0, filed Apr. 18, 2008.

BACKGROUND OF THE INVENTION

This invention provides compositions having improved rheological properties based on polycarbonate with rearrangement structures and cyclic and linear oligomers, and shaped articles and extrudates of these polycarbonate compositions.

The process for polycarbonate synthesis is generally known and is described in numerous publications.

EP-A 0 517 044, WO 2006/072344 and EP-A 1 609 818 and documents cited there describe, for example, the interfacial and the melt process for the preparation of polycarbonate.

The preparation of aromatic oligo- and polycarbonates by the melt transesterification process is known in principle from the literature and has been described earlier, for example, in the Encyclopedia of Polymer Science, vol. 10 (1969), Chemistry and Physics of Polycarbonates, Polymer Reviews, H. Schnell, vol. 9, John Wiley and Sons, Inc. (1964) and in DE-C 10 31 512, U.S. Pat. No. 3,022,272, U.S. Pat. No. 5,340,905 and U.S. Pat. No. 5,399,659.

It is known that low molecular weight constituents (oligomers, cyclic structures or additives) in thermoplastics lead to a reduction in the melt viscosity and therefore act as inherent plasticizers. Thus, EP-A 0953605 describes the use of cyclic aromatic carbonates as flow improvers and agents for improving the shape transferability of linear aromatic polycarbonates.

BRIEF SUMMARY OF THE INVENTION

It has now been found, surprisingly, that polycarbonate compositions do not have these disadvantages to the same extent and at the same time have lower melt viscosities, i.e. show better flow properties and therefore improved processing properties in injection moulding if the content of oligomers—sum of linear and cyclic oligomers—is reduced and moreover certain amounts of sometimes polyfunctional rearrangement structures formed from carbonate structures are present, and the polycarbonates preferably have a narrower molecular weight distribution, i.e. a lower inhomogeneity factor $U=(Mw/Mn)-1$. This is all the more surprising since higher and non-reduced oligomer contents are known to lead to an improvement in flow. Furthermore, polyfunctional rearrangement structures are known to lead to branchings and therefore to higher melt viscosities and a broader molecular weight distribution, which is accompanied at the same time by undesirable poorer flow properties.

The present invention therefore provides polycarbonates with one or more structures of the general formulae (I) to (IV)

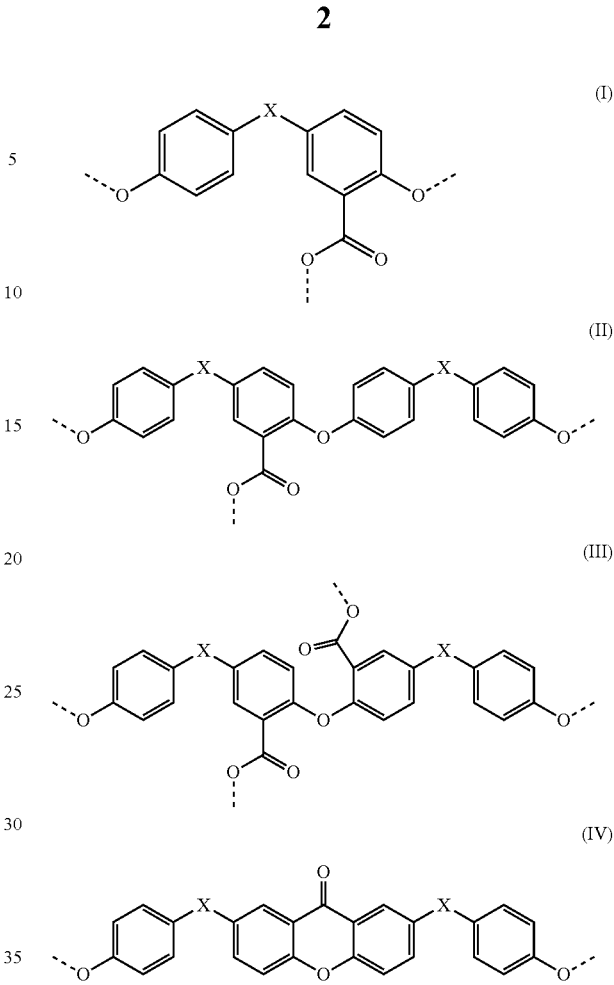

in which the phenyl rings independently of one another can be mono- or disubstituted by $C_1$-$C_8$-alkyl or halogen, such as chlorine or bromine, preferably $C_1$-$C_4$-alkyl, in particular methyl, and X has the meaning given in the case of formula (1a), wherein the amount of structural units (I) to (IV) in total is in general 50 to 900 ppm, based on the underlying polycarbonate, and furthermore containing in total linear and cyclic oligomers in an amount of from 0.1 to 2 wt. %, based on the total composition, wherein the linear oligomers are those of the formulae (V) to (IX)

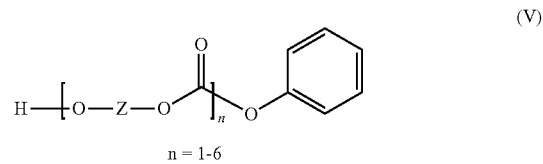

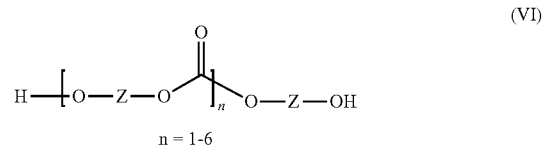

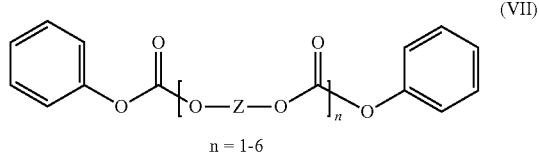

(VII)

n = 1-6

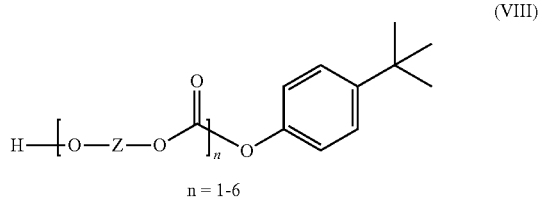

(VIII)

n = 1-6

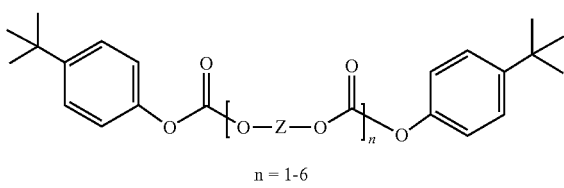

(IX)

n = 1-6 wherein the amount of structures (VIII) and (IX) is less than 0.001 wt. %,
and the cyclic oligomers are those of the general formula (X)

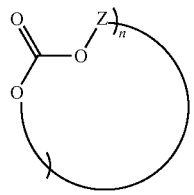

(X)

wherein
n is an integer from 2 to 6 and
Z represents a radical of the formula (1a)

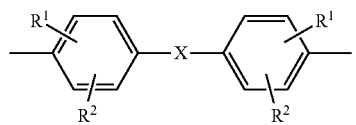

(1a)

in which
$R^1$ and $R^2$ independently of one another represent H or $C_1$-$C_8$-alkyl, preferably H or $C_1$-$C_4$-alkyl, particularly preferably hydrogen or methyl, and
X represents a single bond, $C_1$- to $C_6$-alkylene, $C_2$- to $C_5$-alkylidene or $C_5$- to $C_6$-cycloalkylidene, which can be substituted by $C_1$- to $C_6$-alkyl, preferably methyl or ethyl.

DETAILED DESCRIPTION OF THE INVENTION

In the context of the present application, the structural units of the formulae (I) to (IV) are also called rearrangement structures for simplification. The structural units are derived and result from the diphenols or diphenol mixtures employed for the preparation of the polycarbonate. Thus e.g. in the case of bisphenol A as the diphenol, the phenyl rings of the rearrangement structures are unsubstituted.

The cyclic oligomers of the general formula (X) contained in the polycarbonate compositions according to the invention are preferably contained in amounts of from 0.2 to 1.2, particularly preferably 0.2 to 1.1 and very particularly preferably 0.3 to 1 wt. %.

The cyclic structures contained in the compositions have essentially, i.e. to the extent of more than 95%, ring sizes where n=2 to 6. Preferably, ring sizes where n=3 and/or n=4, particularly preferably n=3 occur.

The linear oligomers of the general formula (V) to (VII) contained in the polycarbonate compositions according to the invention are preferably contained in amounts of from 0.2 to 1.2, particularly preferably 0.3 to 1.1 and very particularly preferably 0.4 to 0.9 wt. %.

The rearrangement structures defined above occur in various amounts and ratios with respect to one another. Their amount can be determined by total hydrolysis of the polycarbonate composition.

In the degradation for analysis purposes, the low molecular weight degradation products of the formulae (Ia) to (IVa) characteristic for the particular rearrangement structure are formed, the amount thereof being determined by means of HPLC

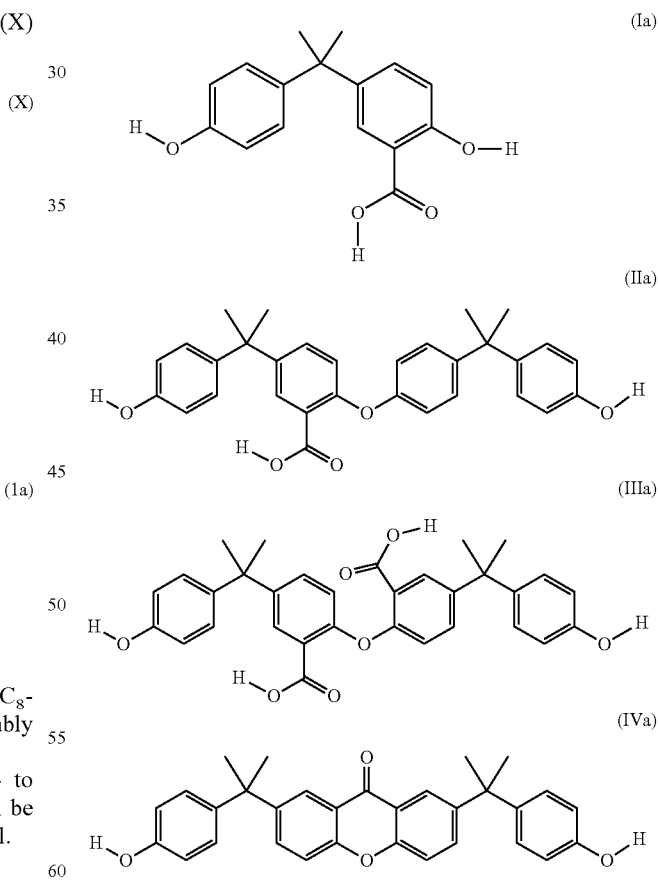

wherein the phenyl rings can be substituted as stated above in the description of the formulae (I) to (IV).

The amount of compound of the formula (Ia) released by this procedure is typically 50 to 800 ppm, preferably from 70 to 700 ppm, particularly preferably from 100 to 600 ppm and very particularly preferably from 100 to 550 ppm.

The amount of compound of the formula (IIa) released by this procedure is typically 0 (below the detection limit of <5 ppm) to 100 ppm, preferably from 0 to 90 ppm, particularly preferably from 0 to 80 ppm and very particularly preferably from 0 to 70 ppm.

The amount of compound of the formula (IIIa) released by this procedure is typically 0 (below the detection limit of <5 ppm) to 60 ppm, preferably from 0 to 50 ppm, particularly preferably from 5 to 40 ppm and very particularly preferably from 5 to 30 ppm.

The amount of compound of the formula (IVa) released by this procedure is typically 0 (below the detection limit of <5 ppm) to 300 ppm, preferably from 5 to 280 ppm, particularly preferably from 5 to 270 ppm and very particularly preferably from 10 to 260 ppm.

For simplification reasons, the amount of structures of the formula (I) to (IV) is equated with the amount of compounds of the formulae (Ia) to (IVa) released.

Preferably, the polycarbonates have the following inhomogeneity factor, the inhomogeneity factor for various molecular weight ranges being as follows:

for low-viscosity PC according to the invention having an average molecular weight (weight-average) of from 18,000 to 22,000 g/mol, U is 1.08 to 1.18, preferably 1.10 to 1.16, for medium-viscosity PC according to the invention having an average molecular weight (weight-average) of from greater than 22,000 to 26,000 g/mol, U is 1.18 to 1.60, preferably 1.20 to 1.55, particularly preferably 1.20 to 1.50, very particularly preferably 1.20 to 1.45.

for high-viscosity PC according to the invention having an average molecular weight (weight-average) of from greater than 26,000 to 30,000 g/mol, U is 1.25 to 1.65, preferably 1.25 to 1.60, particularly preferably 1.25 to 1.50 and very particularly preferably 1.30 to 1.45, for very high-viscosity PC according to the invention having an average molecular weight (weight-average) of greater than 30,000 g/mol and preferably less than 50,000 g/mol, U is 1.50 to 1.95, preferably 1.55 to 1.90, particularly preferably 1.55 to 1.85, very particularly preferably 1.55 to 1.80.

For the preparation of the compositions according to the invention which comprise the rearrangement structures and reduced content of oligomers (cyclic and linear) essential to the invention and preferably have a relatively narrow molecular weight distribution (relatively low inhomogeneity factor U), aromatic dihydroxy compounds are transesterified in the melt with carbonic acid diesters with the aid of particular catalysts and optionally further additives.

The polycarbonate compositions according to the invention with reduced cyclic carbonate contents and rearrangement structures and having a relatively narrow molecular weight distribution (relatively low inhomogeneity factor U) are prepared by the melt transesterification process from aromatic dihydroxy compounds with carbonic acid diesters in the presence of ammonium or phosphonium salts as catalysts.

Diphenols which are suitable for the preparation of polycarbonates are those of the formula (1)

$$HO-Z-OH \quad (1)$$

in which Z represents a radical of the formula (1a)

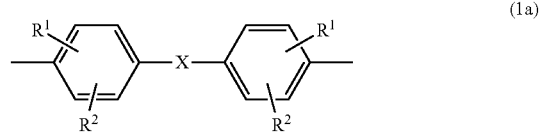

(1a)

in which
$R^1$ and $R^2$ independently of one another represent H, $C_1$-$C_8$-alkyl, preferably H or $C_1$-$C_4$-alkyl, particularly preferably hydrogen or methyl, and
X represents a single bond, $C_1$- to $C_6$-alkylene, $C_2$- to $C_5$-alkylidene or $C_5$- to $C_6$-cycloalkylidene, which can be substituted by $C_1$- to $C_6$-alkyl, preferably methyl or ethyl.

Preferably, X represents a single bond, methylene, isopropylidene, cyclohexylidene or 3,3,5-trimethylcyclohexylidene, particularly preferably isopropylidene or 3,3,5-trimethylcyclohexylidene.

Examples of such dihydroxyaryl compounds are: dihydroxybenzenes, dihydroxydiphenyls, bis-(hydroxyphenyl)-alkanes, bis-(hydroxyphenyl)-cycloalkanes and nucleus-alkylated compounds thereof.

Dihydroxyaryl compounds are generally known or can be prepared by generally known processes (e.g. WO 2006/072344, EP-A 1609818 and literature cited therein).

Preferred diphenols of the formula (1) are: 2,2-bis-(4-hydroxyphenyl)-propane (BPA), bis-(4-hydroxyphenyl)-3,3,5-trimethyl-cyclohexane and 4,4'-dihydroxydiphenyl.

It is possible to use either one dihydroxyaryl compound to form homopolycarbonates, or various dihydroxyaryl compounds to form copolycarbonates. The latter is of importance in particular if products having particular combinations of properties are to be prepared.

Instead of the monomeric dihydroxyaryl compounds, low molecular weight oligocarbonates predominantly terminated by OH end groups can also be employed as the starting compound.

The dihydroxyaryl compounds can also be employed with residual contents of the monohydroxyaryl compounds from which they have been prepared, or the low molecular weight oligocarbonates can be employed with residual contents of the monohydroxyaryl compounds which have been split off in the preparation of the oligomers. The residual contents of the monohydroxyaryl compounds can be up to 20%, preferably 10%, particularly preferably up to 5% and very particularly preferably up to 2% (see e.g. EP-A 1 240 232).

The dihydroxyaryl compounds used, like all the other raw materials, chemicals and auxiliary substances added to the synthesis, may be contaminated with impurities originating from their own synthesis, handling and storage, although it is desirable and the aim to work with raw materials, chemicals and auxiliary substances which are as pure as possible.

The diaryl carbonates which are suitable for the reaction with the dihydroxyaryl compounds are those of the formula (2)

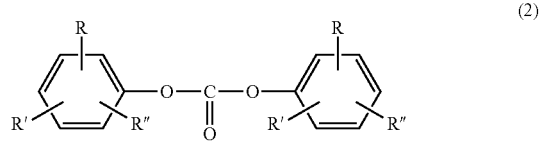

(2)

wherein R, R' and R" independently of one another can be identical or different and represent hydrogen, optionally branched $C_1$-$C_{34}$-alkyl, $C_7$-$C_{34}$-alkylaryl or $C_6$-$C_{34}$-aryl, and R can furthermore also denote —COO—R''', wherein R''' represents hydrogen, optionally branched $C_1$-$C_{34}$-alkyl, $C_7$-$C_{34}$-alkylaryl or $C_6$-$C_{34}$-aryl.

Such diaryl carbonates are described, for example, in EP-A 1 609 818. Preferred diaryl compounds are diphenyl carbonate, 4-tert-butylphenyl phenyl carbonate, di-(4-tert-butylphenyl)carbonate, biphenyl-4-yl phenyl carbonate, di-(biphenyl-4-yl)carbonate, 4-(1-methyl-1-phenylethyl)-phenyl phenyl carbonate and di-[4-(1-methyl-1-phenylethyl)-phenyl]carbonate.

Diphenyl carbonate is particularly preferred.

The diaryl carbonates can also be employed with residual contents of the monohydroxyaryl compounds from which they have been prepared. The residual contents of the monohydroxyaryl compounds can be up to 20%, preferably 10%, particularly preferably up to 5% and very particularly preferably up to 2%.

Based on the dihydroxyaryl compound, the diaryl carbonates are in general employed with 1.02 to 1.30 mol, preferably with 1.04 to 1.25 mol, particularly preferably with 1.06 to 1.22 mol, very particularly preferably with 1.06 to 1.20 mol per mol of dihydroxyaryl compound. Mixtures of the abovementioned diaryl carbonates can also be employed.

A monohydroxyaryl compound which has not been used for the preparation of the diaryl carbonate can additionally be employed to control or vary the end groups. It is represented by the following general formula (3):

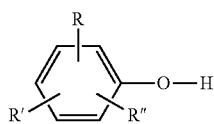

(3)

wherein R, R' and R'' have the meaning given for $R^1$ and $R^2$ in the case of formula (Ia). Phenol is preferred, i.e. all the radicals in (3) represent H.

In this context, a monohydroxyaryl compound which has a boiling point above that of the monohydroxyaryl compound which was employed for the preparation of the diaryl carbonates used is to be chosen. The monohydroxyaryl compound can be added at any point in time in the course of the reaction. It is preferably added at the start of the reaction or, however, also at any desired point in the course of the process. The content of free monohydroxyaryl compound can be 0.2-20 mol %, preferably 0.4-10 mol %, based on the dihydroxyaryl compound.

The end groups can also be varied by co-using a diaryl carbonate based on a monohydroxyaryl compound having a higher boiling point than the monohydroxyaryl compound on which the diaryl carbonate chiefly employed is based. Here also, the diaryl carbonate can be added at any point in time in the course of the reaction. It is preferably added at the start of the reaction or, however, also at any desired point in the course of the process. The content of the diaryl carbonate based on the higher-boiling monohydroxyaryl compound in the total amount of diaryl carbonate employed can be 1-40 mol %, preferably 1-20 mol % and particularly preferably 1-10 mol %.

Ammonium or phosphonium salts, called onium salts in the following, are employed as catalysts in the melt transesterification process essential to the invention. Phosphonium salts are preferably employed. Phosphonium salts in the context of the invention are those of the general formula (4)

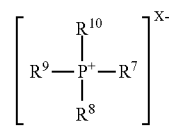

(4)

wherein $R^{7-10}$ can be the same or different $C_1$-$C_{10}$-alkyls, $C_6$-$C_{14}$-aryls, $C_7$-$C_{15}$-arylalkyls or $C_5$-$C_6$-cycloalkyls, preferably methyl or $C_6$-$C_{14}$-aryls, particularly preferably methyl or phenyl, and $X^-$ can be an anion, such as hydroxide, sulfate, hydrogen sulfate, bicarbonate, carbonate or a halide, preferably chloride, or an alkylate or arylate of the formula —OR, wherein R can be a $C_6$-$C_{14}$-aryl, $C_7$-$C_{15}$-arylalkyl or $C_5$-$C_6$-cycloalkyl, preferably phenyl.

Particularly preferred catalysts are tetraphenylphosphonium chloride, tetraphenylphosphonium hydroxide and tetraphenylphosphonium phenolate, tetraphenylphosphonium phenolate being particularly preferred.

They are preferably employed in amounts of from $10^{-8}$ to $10^{-3}$ mol per mol of dihydroxyaryl compound, particularly preferably in amounts of from $10^{-7}$ to $10^{-4}$ mol.

Further catalysts can be used as a co-catalyst in addition to the onium salt of the abovementioned type, in order to increase the speed of the polycondensation.

These include the alkaline-acting salts of alkali metals and alkaline earth metals, such as hydroxides, alkoxides and aryloxides of lithium, sodium and potassium, preferably hydroxides, alkoxides or aryloxides of sodium. Sodium hydroxide and sodium phenolate are most preferred, and also the disodium salt of 2,2-bis-(4-hydroxyphenyl)-propane.

The amounts of alkaline-acting salts of alkali metals and alkaline earth metals as a co-catalyst can be in the range of from 1 to 500 ppb, preferably 5 to 300 ppb and most preferably 5 to 200 ppb, in each case calculated as sodium and based on the polycarbonate to be formed.

The alkaline-acting salts of alkali metals and alkaline earth metals can already be employed during the preparation of the oligocarbonates, that is to say at the start of the synthesis, or, however, can also be admixed only before the polycondensation, in order to suppress undesirable side reactions.

There is also the possibility of adding supplementary amounts of onium catalysts of the same type or of another type before the polycondensation.

The catalysts are added in solution, in order to avoid harmful excess concentrations during the metering. The solvents are compounds inherent to the system and process, such as, for example, dihydroxyaryl compounds, diaryl carbonates or monohydroxyaryl compounds. Monohydroxyaryl compounds are particularly preferred, because the person skilled in the art is familiar with the fact that dihydroxyaryl compounds and diaryl carbonates already readily change and decompose at slightly elevated temperatures, especially under the action of catalyst. The polycarbonate qualities suffer by this means. In the industrially important transesterification process for the preparation of polycarbonate, phenol is the preferred compound. Phenol is also necessarily already suitable because the catalyst preferably used, tetraphenylphosphonium phenolate, is isolated as a mixed crystal with phenol during the preparation.

The weight-average molecular weights of the polycarbonates are in general 15,000 to 50,000, preferably 17,000 to 40,000, particularly preferably 17,000 to 34,000 g/mol, and are determined by GPC against a polycarbonate calibration.

The polycarbonates in general have an extremely low content of cations and anions of in each case less than 60 ppb, preferably <40 ppb and particularly preferably <20 ppb (calculated as the Na cation), cations present being those of alkali and alkaline earth metals, which can originate, for example, as an impurity from the raw materials used and the phosphonium and ammonium salts. Further ions, such as Fe, Ni, Cr, Zn, Sn, Mo and Al ions and their homologues, can be contained in the raw materials or originate by wear or corrosion from the materials of the installation used. The content of these ions in total is less than 2 ppm, preferably less than 1 ppm and particularly preferably less than 0.5 ppm.

Anions which are present are those of inorganic acids and of organic acids in equivalent amounts (e.g. chloride, sulfate, carbonate, phosphate, phosphite, oxalate and others).

Very small amounts, which can only be achieved by using very pure raw materials, are thus the aim. Raw materials of such purity are obtainable e.g. only by purification processes such as recrystallization, distillation, reprecipitation with washing and the like.

The process according to the invention for the preparation of polycarbonate by the transesterification process can be discontinuous or also continuous in design. When the dihydroxyaryl compounds and diaryl carbonates, optionally with further compounds, are present as a melt, the reaction is started in the presence of the catalyst essential to the invention. The conversion or the molecular weight is increased at increasing temperatures under decreasing pressures in suitable apparatuses and devices by removal of the monohydroxyaryl compound split off, until the end state aimed for is achieved. By choice of the ratio of dihydroxyaryl compound to diaryl carbonate, of the loss rate of the diaryl carbonate via the vapours determined by the choice of procedure or installation for the preparation of the polycarbonate, and of compounds optionally added, such as, for example, a higher-boiling monohydroxyaryl compound, the nature and concentration of end groups is determined.

There is no limitation and restriction with respect to by what manner and method, in what installation and by what procedure the process is carried out.

There is furthermore no specific limitation and restriction with respect to the temperatures, the pressures and the catalysts used, in order to carry out the melt transesterification reaction between the dihydroxyaryl compound and the diaryl carbonate, and optionally also other reactants added. Any condition is possible, as long as the temperatures, pressures and catalysts chosen render possible a melt transesterification with correspondingly rapid removal of the monohydroxyaryl compound split off.

The temperatures over the entire process are in general 180 to 330° C., under pressures of from 15 bar absolute to 0.01 mbar absolute.

A continuous procedure is usually chosen, because that is advantageous for the product quality.

Preferably, the continuous process for the preparation of polycarbonates is characterized in that one or more dihydroxyaryl compounds with the diaryl carbonate, optionally also other reactants added, using the catalysts, after a precondensation without the monohydroxyaryl compound formed being separated off, in several subsequent reaction evaporator stages at temperatures increasing stepwise under pressures decreasing stepwise, the molecular weight is built up to the desired level.

The devices, apparatuses and reactors suitable for the individual reaction evaporator stages are, according to the course of the process, heat exchangers, pressure-release apparatuses, separators, columns, evaporators, stirred tanks and reactors or other commercially obtainable apparatuses which provide the necessary dwell time at selected temperatures and pressures. The devices chosen must render possible the necessary introduction of heat and be constructed such that they meet the requirements of the continuously increasing melt viscosities.

All the devices are connected to one another via pumps, pipelines and valves. The pipelines between all the equipment should of course be as short as possible, and the curvatures of the lines should be kept as small as possible in order to avoid unnecessarily prolonged dwell times. In this context, the external, that is to say technical framework conditions and requirements for assembly of chemical installations are to be taken into account.

For carrying out the process by a preferred continuous procedure, either the reaction partners can be melted together, or the solid dihydroxyaryl compound can be dissolved in the diaryl carbonate melt or the solid diaryl carbonate can be dissolved in the melt of the dihydroxyaryl compound or the two raw materials are brought together as a melt, preferably directly from the preparation. The dwell times of the separate melts of the raw materials, in particular those of the melt of the dihydroxyaryl compound, are set as short as possible. On the other hand, the melt mixture can dwell longer at correspondingly lower temperatures without losses in quality because of the lowered melting point of the raw material mixture compared with the individual raw materials.

Thereafter, the catalyst, preferably dissolved in phenol, is admixed and the melt is heated to the reaction temperature. At the start of the industrially important process for the preparation of polycarbonate from 2,2-bis-(4-hydroxyphenyl)-propane and diphenyl carbonate, this is 180 to 220° C., preferably 190 to 210° C., very particularly preferably 190° C. At dwell times of from 15 to 90 min, preferably 30 to 60 min, reaction equilibrium is established without the hydroxyaryl compound formed being removed. The reaction can be carried out under atmospheric pressure, but for technical reasons also under increased pressure. The preferred pressure in industrial installations is 2 to 15 bar absolute.

The melt mixture is released into a first vacuum chamber, the pressure of which is set at 100 to 400 mbar, preferably to 150 to 300 mbar, and directly thereafter is heated again to the entry temperature in a suitable device under the same pressure. During the releasing operation the hydroxyaryl compound formed is evaporated with the monomers still present. After a dwell time of from 5 to 30 min in a bottom product receiver, optionally with pumped circulation and under the same pressure at the same temperature, the reaction mixture is released into a second vacuum chamber, the pressure of which is 50 to 200 mbar, preferably 80 to 150 mbar, and directly thereafter is heated to a temperature of from 190 to 250° C., preferably 210 to 240° C., particularly preferably 210 to 230° C., in a suitable device under the same pressure. Here also, the hydroxyaryl compound formed is evaporated with the monomers still present. After a dwell time of from 5 to 30 min in a bottom product receiver, optionally with pumped circulation and under the same pressure at the same temperature, the reaction mixture is released into a third vacuum chamber, the pressure of which is 30 to 150 mbar, preferably 50 to 120 mbar, and directly thereafter is heated to a temperature of from 220 to 280° C., preferably 240 to 270° C., particularly preferably 240 to 260° C., in a suitable device under the same pressure. Here also, the hydroxyaryl compound formed is evaporated with the monomers still present. After a dwell time of from 5 to 20 min in a bottom product receiver, optionally with pumped circulation and under the same pressure at the same temperature, the reaction mixture is released into a further vacuum chamber, the pressure of which is 5 to 100 mbar, preferably 15 to 100 mbar, particularly preferably 20 to 80 mbar, and directly thereafter is heated to a temperature of from 250 to 300° C., preferably 260 to 290° C., particularly preferably 260 to 280° C., in a suitable device under the same pressure. Here also, the hydroxyaryl compound formed is evaporated with the monomers still present.

The number of these stages, 4 by way of example here, can vary between 2 and 6. The temperatures and pressures are to be adapted accordingly if the number of stages changes, in order to obtain comparable results. The rel. viscosity of the oligomeric carbonate achieved in these stages is between 1.04 and 1.20, preferably between 1.05 and 1.15, particularly preferably between 1.06 to 1.10.

The oligocarbonate produced in this way is conveyed, after a dwell time of from 5 to 20 min in a bottom product receiver, optionally with pumped circulation and under the same pressure at the same temperature as in the last flash/evaporator stage, into a disc or basket reactor and subjected to a further condensation reaction at 250 to 310° C., preferably 250 to 290° C., particularly preferably 250 to 280° C., under pressures of from 1 to 15 bar, preferably 2 to 10 mbar, over dwell times of from 30 to 90 min, preferably 30 to 60 min. The product reaches a rel. viscosity of from 1.12 to 1.28, preferably 1.13 to 1,26, particularly preferably 1.13 to 1.24.

The melt leaving this reactor is brought to the desired end viscosity or the end molecular weight in a further disc or basket reactor. The temperatures are 270 to 330° C., preferably 280 to 320° C., particularly preferably 280 to 310° C., the pressure is 0.01 to 3 mbar, preferably 0.2 to 2 mbar, over dwell times of from 60 to 180 min, preferably 75 to 150 min. The rel. viscosities are set at the level necessary for the envisaged use and are 1.18 to 1.40, preferably 1.18 to 1.36, particularly preferably 1.18 to 1.34.

The function of the two basket reactors or disc reactors can also be combined in one basket reactor or disc reactor.

The vapours from all the process stages are removed directly, collected and worked up. This working up is as a rule carried out by distillation in order to achieve high purities of the substances recovered. This can be carried out, for example, in accordance with German Patent Application no. 10 100 404. Recovery and isolation of the monohydroxyaryl compound split off in a very pure form is a matter of course from the economic and ecological aspect. The monohydroxyaryl compound can be used directly for the preparation of a dihydroxyaryl compound or a diaryl carbonate.

The disc or basket reactors are distinguished in that they provide a very large, constantly renewing surface to the vacuum over high dwell times. The disc or basket reactors are constructed geometrically according to the melt viscosities of the products. Reactors such as are described in DE 44 47 422 C2 and EP A 1 253 163, or twin screw reactors such as are described in WO A 99/28370, for example, are suitable.

The oligocarbonates, including very low molecular weight oligocarbonates, and the finished polycarbonates are as a rule conveyed by means of gear pumps, screws of the most diverse design or displacement pumps of specific design.

Particularly suitable materials for production of the apparatuses, reactors, pipelines, pumps and fittings are non-rusting steels of the type Cr Ni (Mo) 18/10, such as e.g. 1.4571 or 1.4541 (Stahlschlüssel 2001, Verlag: Stahlschlüssel Wegst GmbH, Th-Heuss-Straβe 36, D-71672 Marbach) and Ni-based alloys of the C type, such as e.g. 2.4605 or 2.4610 (Stahlschlüssel 2001, Verlag: Stahlschlüssel Wegst GmbH, Th-Heuss-Straβe 36, D-71672 Marbach). The non-rusting steels are used up to process temperatures of about 290° C., and the Ni-based alloys at process temperatures above about 290° C.

The polycarbonate obtained can furthermore be provided with further conventional additives and additional substances (e.g. auxiliary and reinforcing substances) after addition of the inhibitors according to the invention. The addition of additives and additional substances serves to prolong the useful life (e.g. hydrolysis or degradation stabilizers), improve the colour stability (e.g. heat and UV stabilizers), simplify processing (e.g. mould release agents, flow auxiliaries), improve the use properties (e.g. antistatics), improve the flameproofing, influence the visual impression (e.g. organic colouring agents, pigments) or adapt the polymer properties to particular stresses (impact modifiers, finely divided minerals, fibre substances, quartz flour, glass fibres and carbon fibres). Everything can be combined as desired in order to adjust and achieve the desired properties. Such additional substances and additives are described e.g. in "Plastics Additives", R. Gächter and H. Müller, Hanser Publishers 1983.

Suitable heat stabilizers are, preferably, tris-(2,4-di-tert-butylphenyl)phosphite (Irgafos 168), tetrakis(2,4-di-tert-butylphenyl)[1,1-biphenyl]-4,4'-diyl bisphosphonite, trisoctyl phosphate, octadecyl 3-(3,5-di-tert-butyl-4-hydroxyphenyl) propionate (Irganox 1076), bis(2,4-dicumylphenyl)pentaerythritol diphosphite (Doverphos S-9228), bis(2,6-di-tert-butyl)-4-methylphenyl)pentaerythritol dihosphite (ADK STAB PEP-36) or triphenylphosphine. They are employed by themselves or in a mixture (e.g. Irganox B900 or Doverphos S-92228 with Irganox B900 or Irganox 1076).

Suitable mould release agents are, preferably, pentaerythritol tetrastearate, glycerol monostearate, stearyl stearate or propanediol stearate. They are employed by themselves or in a mixture.

Suitable light stabilizers are, preferably, benzotriazoles, triazines, benzophenones, cyanoacrylates, cinnamic acid esters or oxalanilides. They are employed by themselves or in a mixture.

These additives and additional substances can be added to the polymer melt individually or in any desired mixtures or several different mixtures, and in particular directly during isolation of the polymer or after melting of granules in a so-called compounding step.

In this context, the additives and additional substances or mixtures thereof can be added to the polymer melt as a solid, that is to say as a powder, or as a melt. Another type of metering is the use of masterbatches or mixtures of masterbatches of the additives or additive mixtures.

These substances are preferably added to the finished polycarbonate on conventional units, but they can also be added at another stage in the preparation process of the polycarbonate, according to requirements.

Suitable additives are described, for example, in Additives for Plastics Handbook, John Murphy, Elsevier, Oxford 1999 or Plastics Additives Handbook, Hans Zweifel, Hanser, Munich 2001.

Inhibitors (quenching agents) for deactivation of catalyst residues can moreover be added to the polymer melt in the pure form, dissolved in an inert solvent or as a masterbatch. Suitable inhibitors are acid components, such as Lewis or Brönsted acids or esters of strong acids. The pKa value of the inhibitor should be not greater than 5, preferably less than 3. The acid component is or esters thereof are added in order to deactivate the reaction mixture, that is to say in the ideal case to bring the reaction to a complete halt. The acid component is added in concentrations of <20 ppm, preferably <10 ppm, particularly preferably <5 ppm and very particularly preferably $\leq$2.5 ppm. When the desired molecular weight is reached, the detectable amount of P is in the 1 ppm region. Needless to say, the molar amounts of inhibitor which are to be employed according to the invention are below the molar residual amounts of catalyst to be assumed from the P value.

Examples of suitable acid components are: ortho-phosphoric acid, phosphorous acid, pyrophosphoric acid, hypophosphoric acid, polyphosphoric acids, benzenephosphonic acid, sodium dihydrogen phosphate, boric acid, arylboronic acids, hydrochloric acid (hydrogen chloride), sulfuric acid, ascorbic acid, oxalic acid, benzoic acid, salicylic acid, formic acid, acetic acid, adipic acid, citric acid, benzenesulfonic acid, toluenesulfonic acid, dodecylbenzenesulfonic acid and all other phenyl-substituted benzenesulfonic acids, nitric acid, terephthalic acid, isophthalic acid, stearic acid and other fatty acids, acid chlorides, such as chloroformic acid phenyl ester, stearic acid chloride, acetoxy-BP-A and benzoyl chloride, and esters, half esters and bridged esters of the abovementioned acids, such as, for example, toluenesulfonic acid esters, phosphoric acid esters, phosphorous acid esters, phosphonic acid esters, dimethyl sulfate, boric acid esters, arylboronic acid esters and other components which generate acid under the influence of water, such as triisooctyl phosphate, Ultranox® 640 and BDP (bisphenol diphosphate oligomer).

Preferred possible acid components in this context are ortho-phosphoric acid, phosphorous acid, pyrophosphoric acid, hypophosphoric acid, polyphosphoric acids, benzenephosphonic acid, sodium dihydrogen phosphate, boric acid, arylboronic acids, benzoic acid, salicylic acid, benzenesulfonic acid, toluenesulfonic acid, dodecylbenzenesulfonic acid and all other phenyl-substituted benzenesulfonic acids, acid chlorides, such as chloroformic acid phenyl ester, stearic acid chloride, acetoxy-BP-A and benzoyl chloride, and esters, half esters and bridged esters of the abovementioned acids, such as, for example, toluenesulfonic acid esters, phosphoric acid esters, phosphorous acid esters, phosphonic acid esters, boric acid esters, arylboronic acid esters and other components which generate acid under the influence of water, such as triisooctyl phosphate, Ultranox® 640 and BDP.

Preferred suitable inhibitors are bridged esters of organic sulfur-containing acids selected from at least one compound a) of the formula (5)

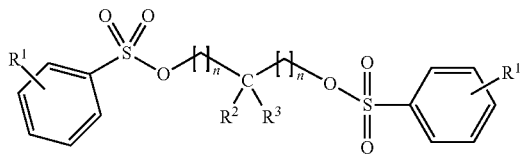

(5)

in which $R^1$ independently represents hydrogen or $C_1$-$C_{20}$-alkyl, preferably $C_1$-$C_8$-alkyl, particularly preferably unsubstituted $C_1$-$C_6$-alkyl, very particularly preferably $C_1$-$C_4$-alkyl, wherein alkyl can be substituted by halogen, in particular hydrogen or methyl, $R^2$ and $R^3$ independently of one another represent hydrogen, $C_1$-$C_6$-alkyl or $C_4$-$C_{30}$-alkylcarboxyl, preferably $C_1$-$C_4$-alkyl or $C_6$-$C_{25}$-alkylcarboxyl, particularly preferably $C_8$-$C_{20}$-alkylcarboxyl, in particular hydrogen, $C_{17}$-alkylcarboxyl or $C_{15}$-alkylcarboxyl, or the radical

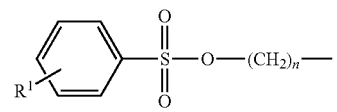

wherein $R^1$ has the abovementioned meaning, n represents an integer from 0 to 8, preferably 0 to 6, in particular 0, 1 or 2.

Particularly preferred possible acid components are ortho-phosphoric acid, pyrophosphoric acid, polyphosphoric acids, benzenephosphonic acid, benzoic acid, benzenesulfonic acid, toluenesulfonic acid, dodecylbenzenesulfonic acid and all other phenyl-substituted benzenesulfonic acids and esters, half esters and bridged esters of the abovementioned acids, such as, for example, toluenesulfonic acid esters, phosphoric acid esters, phosphorous acid esters, phosphonic acid esters and other components which generate acid under the influence of water, such as triisooctyl phosphate, Ultranox® 640 and BDP.

Very particularly preferred possible acid components are ortho-phosphoric acid, pyrophosphoric acid, benzenesulfonic acid, toluenesulfonic acid, dodecylbenzenesulfonic acid and all other phenyl-substituted benzenesulfonic acids and esters, half esters and bridged esters of the abovementioned acids, such as, for example, toluenesulfonic acid esters and phosphoric acid esters.

The following inhibitor of the formula (6) is very particularly preferred:

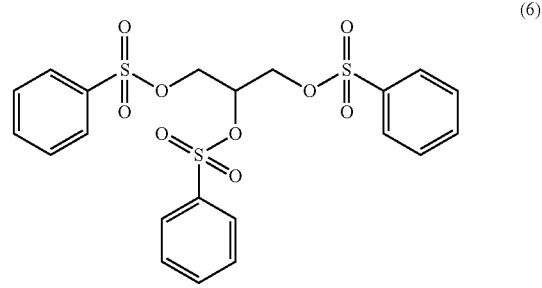

(6)

The acid components can be metered into the composition in solid, liquid or gaseous form. In a preferred procedure, the acid component is continuously admixed homogeneously into the product stream which is to be freed from monomers in the preparation process directly after the end molecular weight aimed for has been reached, in order to start the evaporation of the residual monomers immediately thereafter. In a particularly preferred procedure, the addition of additive to improve individual properties of the product is carried out after the metering of acid and the reduction of the residual monomer content, and is not combined with the step of reduction of the residual monomer content because additives which are volatile in the vacuum essential for the reduction of the residual monomer content and are then difficult to adjust in the necessary concentrations in the polymer are often used.

The acid components are preferably added in liquid form. Since the amounts to be metered in are very low, solutions of the acid components are preferably used.

Suitable solvents are those which do not interfere with the process, are chemically inert and evaporate rapidly.

Possible solvents are all organic solvents having a boiling point under normal pressure of from 30 to 300° C., preferably from 30 to 250° C. and particularly preferably from 30 to 200° C., and a water—which also includes water of crystallization. Those compounds which occur in the particular processes are preferably chosen. Any residues which remain do not reduce the quality, depending on the profile of requirements of the product to be prepared.

Solvents are, in addition to water, alkanes, cycloalkanes and aromatics, which can also be substituted. The substituents can be aliphatic, cycloaliphatic or aromatic radicals in varying combination, as well as halogens or a hydroxyl group. Hetero atoms, such as, for example, oxygen, can also be bridge members between aliphatic, cycloaliphatic or aromatic radicals, it being possible for the radicals to be identical or different. Further solvents can also be ketones and esters of organic acids, as well as cyclic carbonates.

Examples are, in addition to water, n-pentane, n-hexane, n-heptane and isomers thereof, cyclohexane, toluene and xylene, methylene chloride, ethyl chloride, ethylene chloride, chlorobenzene, methanol, ethanol, propanol, butanol and isomers thereof, phenol, o-, m- and p-cresol, diethyl ether, dimethyl ketone, polyethylene glycols, polypropylene glycols, ethyl acetate, ethylene carbonate and propylene carbonate.

Water, phenol, propylene carbonate, ethylene carbonate and toluene are preferably suitable for the polycarbonate process.

Water, phenol and propylene carbonate are particularly preferably suitable.

Static mixers or other mixers which lead to a homogeneous mixing in, such as, for example, extruders, are suitable for effective mixing in of the inhibitor.

The polycarbonates according to the invention can be subjected to a residual degassing of monomers (e.g. diphenyl carbonate, phenol, BPA) and short oligomers and small rings after prior or simultaneous deactivation (quenching) of catalyst residues. This can be achieved with or without an entraining gas, e.g. nitrogen, in the last reactor or a subsequent degassing unit.

The present application also provides extrudates and shaped articles, in particular those for use in the transparent sector, which are obtainable from the compositions according to the invention.

Fields of use can be: safety screens, shields for helmets, films, blow mouldings, such as, among others, water bottles, transparent sheets, such as solid sheets or, in particular, hollow sheets, such as for example for covering buildings, such as stations, greenhouses and lighting installations, traffic light housings or traffic signs, foams having an open or closed, optionally printable surface, filaments and wires (see also DE-A 11 37 167), lighting uses, optionally using glass fibres for uses in the translucent sector, translucent formulations with a content of barium sulfate and/or titanium dioxide and/or zirconium oxide or organic polymeric acrylate rubbers (EP-A 0 634 445, EP-A 0 269 324) for production of transparent and light-diffusing mouldings, precision injection-moulded parts, such as holders, e.g. lens holders; in this case polycarbonates with glass fibres and an optionally additional content of 1-10 wt. % of molybdenum disulfide (based on the total moulding composition) are optionally used, optical equipment parts, in particular lenses for photographic and film cameras (DE-A 27 01 173), light transmitters, in particular light conductor cables (EP-A 0 089 801) and lighting panels, electrical insulation materials for electrical conductors and for plug housings and plug connectors as well as capacitors, mobile telephone housings, network interface devices, housings for hard disks and data storage systems, carrier materials for organic photoconductors, lamps, searchlights, diffuser screens or internal lenses, medical uses, such as oxygenators, dialysers, foodstuff uses, such as bottles, tableware and chocolate moulds, uses in the automobile sector, such as glazing or in the form of blends with ABS as bumpers, sports articles, such as slalom poles, ski boot buckles, household articles, such as kitchen sinks, wash basins, letterboxes, housings, such as electrical distribution boxes, housings for electrical equipment, such as toothbrushes, hairdryers, coffee machines, machine tools, such as drilling, milling and planing machines and saws, washing machine portholes, safety glasses, sunglasses, corrective spectacles and lenses thereof, lamp coverings, packaging film, chip boxes, chip carriers, boxes for Si wafers and other uses, such as fattening stall doors or animal cages.

EXAMPLES

The relative solution viscosity $\eta_{rel}$, also called eta rel, was determined in methylene chloride at a concentration of 5 g/l at 25° C. using an Ubbelohde viscometer.

The content of phenolic OH was obtained by IR measurement. For this purpose, the difference between a solution of 2 g of polymer in 50 ml of methylene chloride and pure methylene chloride was measured and the difference in extinction at 3582 cm$^{-1}$ was determined.

The flow properties (melt viscosity) of the polymer melts is determined at various temperatures in a capillary rheometer in accordance with ISO 11443. The polycarbonate samples are dried beforehand overnight at 130° C. for this purpose. In the examples, the shear rates in s$^{-1}$ are stated in each case.

The sample is dissolved with methylene chloride. The predominant content of the polymer is precipitated out by addition of acetone. The undissolved contents are filtered off and the filtrate is concentrated to dryness. The dry residue is dissolved with THF and the oligomers are determined by HPLC with UV detection.

Determination of the rearrangement structures (I to IV):

The polycarbonate sample is saponified with sodium methylate under reflux. The saponification solution is acidified and concentrated to dryness. The dry residue is dissolved with acetonitrile and the phenolic compounds (Ia to IVa) are determined by HPLC with UV detection.

The polycarbonate composition PCI was prepared in a melt process as follows:

8,600 kg/h of melt mixture consisting of 4,425 kg of diphenyl carbonate/h (20,658 mol/h) and 4,175 kg of bisphenol A/h (18,287 mol/h), with addition of 0.52 kg of the phenol adduct of tetraphenylphosphonium phenolate with 65.5% of tetraphenylphosphonium phenolate/h (0.786 mol/h; that is to say 0.0043 mol %) dissolved in 4.5 kg of phenol/h are pumped from a reservoir through a heat exchanger, heated to 190° C. and led through a dwell column under 12 bar at 190° C. The average dwell time is 50 minutes.

The melt is then passed via a release valve into a separator which is under a pressure of 200 mbar. The melt flowing out is heated again to 190° C. in a falling film evaporator, which is likewise under a pressure of 200 mbar, and collected in a receiver. After a dwell time of 20 minutes, the melt is pumped into the next three stages of similar construction. The conditions in the 2nd/3rd/4th stage are 100/74/40 mbar; 220/225/273° C. and 20/10/10 minutes. The oligomer fanned has a rel. viscosity of 1.08. All the vapours are led via pressure regulators into a column which is under vacuum and are removed as condensates.

Thereafter, the oligomer is subjected to a condensation reaction to give a higher molecular weight product in a subsequent disc reactor at 290° C. under 0.7 mbar over a dwell time of 120 minutes. The rel. viscosity is 1.257. The vapours are condensed.

The vapours are condensed in the vacuum unit and subsequently.

Polycarbonate compositions PC3, PC5 and PC7 are prepared analogously to PC1, the BPA to DPC ratio being adjusted such that the higher viscosities eta rel are obtained.

PC2, PC4, PC6 and PC8 are comparison examples in which the polycarbonate compositions were obtained by the interfacial process.

The data of the polycarbonate compositions prepared in accordance with the above experiments, including the contents of rearrangement structures and oligomers determined and the inhomogeneity factor U, are reproduced in the following Table 1:

TABLE 1

| Type | | PC1 | PC2 comp. | PC3 | PC4 comp. | PC5 | PC6 comp. | PC7 | PC8 comp. |
|---|---|---|---|---|---|---|---|---|---|
| eta rel | | 1.257 | 1.255 | 1.282 | 1.285 | 1.295 | 1.293 | 1.317 | 1.323 |
| Mn | | 10,622 | 9,386 | 11,621 | 10,141 | 12,322 | | 11,489 | 12,825 |
| Mw | | 24,219 | 23,664 | 27,156 | 26,084 | 28,752 | | 31,348 | 36,983 |
| U | | 1.28 | 1.52 | 1.34 | 1.57 | 1.33 | | 1.73 | 1.88 |
| Rearrangement structures | | | | | | | | | |
| Ia | ppm | 91 | <5 | 363 | <5 | 298 | <5 | 375 | <5 |
| IIa | ppm | 13 | <5 | 56 | <5 | 35 | <5 | 50 | <5 |
| IIIa | ppm | <5 | <5 | 17 | <5 | 12 | <5 | 15 | <5 |
| IVa | ppm | 14 | <5 | 255 | <5 | 103 | <5 | 170 | <5 |
| Oligomer distribution type V - IX | | | | | | | | | |
| V n = 1 to 6 total | % | 0.290 | 0.003 | 0.230 | 0.010 | 0.200 | 0.060 | 0.220 | 0.053 |
| VI n = 1 to 6 total | % | 0.042 | 0.008 | 0.034 | 0.009 | 0.034 | 0.009 | 0.042 | 0.008 |
| VII n = 1 to 6 total | % | 0.680 | 0.009 | 0.560 | 0.071 | 0.590 | 1.030 | 0.430 | 0.860 |
| Cyclic structures X n = 2 to 6 total | % | 0.610 | 1.140 | 0.570 | 1.180 | 0.620 | 1.270 | 0.630 | 1.440 |
| VIII n = 1 to 4 total | % | <0.001 | 0.84 | <0.001 | 0.74 | <0.001 | 0.042 | <0.001 | 0.027 |
| IX total | % | <0.001 | 0.038 | <0.001 | 0.02 | <0.001 | 0.001 | <0.001 | <0.001 |
| Sum of oligomers | % | 1.63 | 2.03 | 1.39 | 2.04 | 1.44 | 2.41 | 1.32 | 2.39 |
| Melt visc. 280° C. | | | | | | | | | |
| 50 | Pas | | | 744 | 742 | 883 | 925 | 1,334 | 1,542 |
| 100 | Pas | 413 | 468 | 718 | 737 | 837 | 898 | 1,247 | 1,456 |
| 200 | Pas | 402 | 467 | 670 | 711 | 766 | 839 | 1,085 | 1,310 |
| 500 | Pas | 356 | 417 | 554 | 593 | 617 | 676 | 813 | 951 |
| 1,000 | Pas | 300 | 338 | 425 | 450 | 462 | 499 | 577 | 645 |
| 1,500 | Pas | 256 | 283 | 345 | 362 | 370 | 396 | 490 | 500 |
| 5,000 | Pas | 129 | 137 | 158 | 164 | 168 | 175 | 250 | 219 |
| Melt visc. 300° C. | | | | | | | | | |
| 50 | Pas | | | | 412 | — | — | 653 | 752 |
| 100 | Pas | | | 359 | 401 | 436 | 470 | 617 | 731 |
| 200 | Pas | 204 | 244 | 348 | 397 | 427 | 459 | 566 | 672 |
| 500 | Pas | 198 | 232 | 309 | 356 | 370 | 403 | 467 | 531 |
| 1,000 | Pas | 178 | 205 | 263 | 300 | 305 | 330 | 371 | 448 |
| 1,500 | Pas | 163 | 183 | 227 | 258 | 259 | 277 | 312 | 365 |
| 5,000 | Pas | 97 | 104 | 121 | 131 | 131 | 136 | 165 | 167 |
| Melt visc. 320° C. | | | | | | | | | |
| 50 | Pas | | | | | | | — | — |
| 100 | Pas | | | | 223 | — | — | 304 | 415 |
| 200 | Pas | 128 | 132 | 190 | 221 | 238 | 262 | 295 | 395 |
| 500 | Pas | 126 | 130 | 178 | 213 | 223 | 246 | 263 | 357 |
| 1,000 | Pas | 119 | 123 | 163 | 191 | 193 | 216 | 216 | 301 |
| 1,500 | Pas | 112 | 115 | 148 | 173 | 167 | 192 | 194 | 266 |
| 5,000 | Pas | 70 | 76 | 91 | 102 | 100 | 108 | 112 | 137 |

TABLE 1-continued

| Type | | PC1 | PC2 comp. | PC3 | PC4 comp. | PC5 | PC6 comp. | PC7 | PC8 comp. |
|---|---|---|---|---|---|---|---|---|---|
| Melt visc. 340° C. | | | | | | | | | |
| 50 | Pas | | | | | — | — | | |
| 100 | Pas | | | | | — | — | | |
| 200 | Pas | | | 118 | 136 | 129 | 145 | 177 | 277 |
| 500 | Pas | 64 | 80 | 113 | 128 | 126 | 142 | 166 | 257 |
| 1,000 | Pas | 64 | 79 | 106 | 122 | 117 | 133 | 148 | 224 |
| 1,500 | Pas | 62 | 77 | 98 | 115 | 108 | 123 | 136 | 200 |
| 5,000 | Pas | 52 | 58 | 68 | 78 | 74 | 82 | 80 | 112 |
| Flow spirals | cm | 26.5 | 25 | 25.5 | 25 | 26 | 25 | 22 | 20 |

It can be seen from Table 1 that PC1, PC3, PC5 and PC7, containing oligomers and polyfunctional rearrangement structures, show in each case lower melt viscosities at comparable solution viscosities, even at high shear rates, that is to say better flow properties and therefore improved processing properties in the injection moulding process, compared with the comparison products without these structures. This effect is likewise observed in the measurement by means of the flow spirals. This is surprising, since rearrangement structures of higher functionality usually lead to branching and therefore to higher melt viscosities.

Furthermore, the inhomogeneity factor of these products is significantly lower compared with the comparison polycarbonates PC2, PC4, PC6 and PC8, in spite of polyfunctional rearrangement structures (branchings), i.e. there is a narrower molecular weight distribution.

In all cases, polycarbonates PC1, PC3, PC5 and PC7 according to the invention have significantly lower contents of cyclic structures than the corresponding comparison examples PC2, PC4, PC6 and PC8. Nevertheless, better flow properties of the polycarbonates according to the invention are found in each case.

It has been found, surprisingly, that the process always delivers a virtually constant and relatively small amount of cyclic structures, whereas the comparison examples have higher contents of cyclic structures with increasing viscosity.

The polycarbonates according to the invention furthermore have a significantly narrower MW distribution (lower inhomogeneity factor U) in spite of the presence of polyfunctional rearrangement structures.

The invention claimed is:

1. A polycarbonate with one or more structures of the general formulae (I) to (IV)

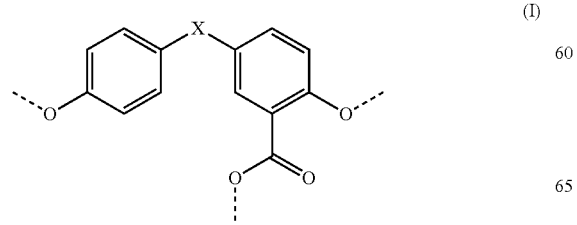
(I)

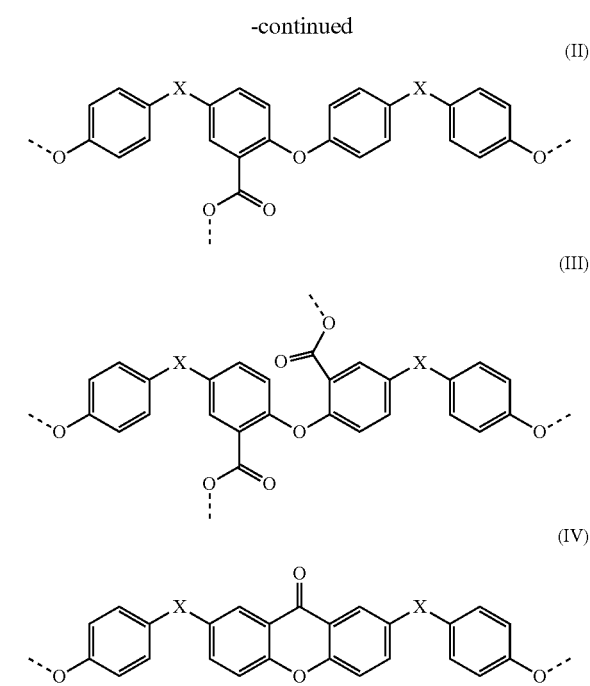

wherein the phenyl rings independently of one another can be mono- or disubstituted by $C_1$-$C_8$-alkyl or halogen, and X has the meaning given in the case of formula (1a),
wherein the amount of structural units (I) to (IV) in total is 50 to 900 ppm, based on the underlying polycarbonate,
wherein the polycarbonate comprises linear and cyclic oligomers in an amount of from 0.1 to 2 wt. %, based on the total composition, wherein the
linear oligomers are those of the formulae (V) to (IX)

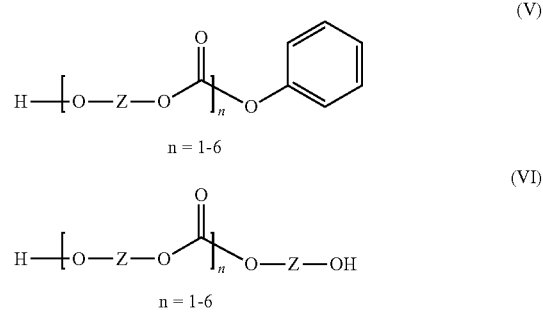

-continued

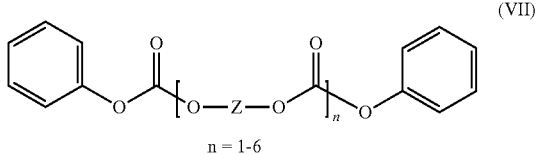
(VII)
n = 1-6

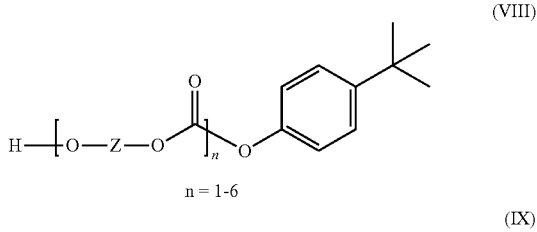
(VIII)
n = 1-6

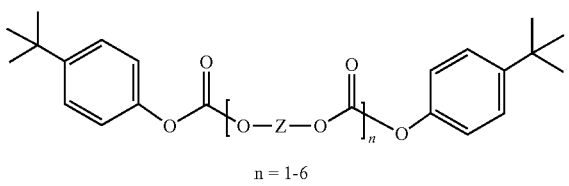
(IX)
n = 1-6 wherein the amount of structures (VIII) and (IX) is less than 0.001 wt. %,
and the cyclic oligomers are those of the general formula (X)

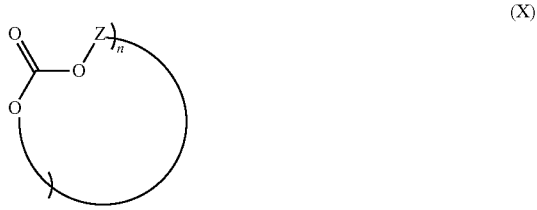
(X)

wherein
n is an integer from 2 to 6 and
Z represents a radical of the formula (1a)

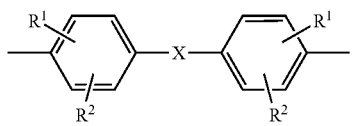
(1a)

in which
$R^1$ and $R^2$ independently of one another represent H or $C_1$-$C_8$-alkyl, and X represents a single bond, to $C_1$- to $C_6$-alkylene, $C_2$- to $C_5$-alkylidene or $C_5$- to $C_6$-cycloalkylidene, which can be substituted by $C_1$- to $C_6$-alkyl.

2. The polycarbonate according to claim 1, wherein the amount of the compound of the formula (I) is 50 to 800 ppm, of the formula (II) is 0 to 100 ppm, of the formula (III) is 0 to 100 ppm and of the formula (IV) is 0 to 300 ppm.

3. The polycarbonate according to claim 1, wherein the polycarbonate has the following inhomogeneity factor:
for a polycarbonate having an average molecular weight (weight-average) of from 18,000 to 22,000 g/mol, U is 1.08 to 1.18,
for a polycarbonate having an average molecular weight (weight-average) of from greater than 22,000 to 26,000 g/mol, U is 1.18 to 1.60,
for a polycarbonate having an average molecular weight (weight-average) of from greater than 26,000 to 30,000 g/mol, U is 1.25 to 1.65,
for a polycarbonate having an average molecular weight (weight-average) of greater than 30,000 g/mol, U is 1.50 to 1.95.

4. The polycarbonate according to claim 3, wherein the polycarbonate having an average molecular weight (weight-average) of greater than 30,000 g/mol is less than 50,000 g/mol.

5. The polycarbonate according to claim 3, wherein the inhomogeneity factor is as follows:
for the polycarbonate having an average molecular weight (weight-average) of from 18,000 to 22,000 g/mol, U is 1.10 to 1.16,
for the polycarbonate having an average molecular weight (weight-average) of from greater than 22,000 to 26,000 g/mol, U is 1.20 to 1.50,
for the polycarbonate having an average molecular weight (weight-average) of from greater than 26,000 to 30,000 g/mol, U is 1.25 to 1.50,
for the polycarbonate having an average molecular weight (weight-average) of greater than 30,000 g/mol, U is 1.55 to 1.85.

6. The polycarbonate according to claim 5, wherein the polycarbonate having an average molecular weight (weight-average) of greater than 30,000 g/mol is less than 50,000 g/mol.

7. The polycarbonate according to claim 1, wherein Z is derived from 2,2-bis-(4-hydroxyphenyl)-propane, bis-(4-hydroxyphenyl)-3,3,5-trimethyl-cyclohexane and 4,4'-dihydroxydiphenyl and X in formulae (I) to (IV) represents a single bond, isopropylidene or 3,3,5-trimethylcyclohexyl.

8. An extrudate or shaped article obtained from polycarbonates according to claim 1.

9. A blend comprising the polycarbonate according to claim 1.

10. The polycarbonate according to claim 1, wherein the $C_1$-$C_8$-alkyl or halogen is chlorine or bromine.

* * * * *